United States Patent [19]

Kowalski et al.

[11] 4,427,836
[45] Jan. 24, 1984

[54] SEQUENTIAL HETEROPOLYMER DISPERSION AND A PARTICULATE MATERIAL OBTAINABLE THEREFROM, USEFUL IN COATING COMPOSITIONS AS A THICKENING AND/OR OPACIFYING AGENT

[75] Inventors: Alexander Kowalski, Glenside; Martin Vogel, Jenkintown; Robert M. Blankenship, Lansdale, all of Pa.

[73] Assignee: Rohm and Haas Company, Philadelphia, Pa.

[21] Appl. No.: 352,396

[22] Filed: Feb. 25, 1982

Related U.S. Application Data

[60] Division of Ser. No. 158,759, Jun. 12, 1980, abandoned, which is a continuation-in-part of Ser. No. 52,280, Jun. 26, 1979, abandoned.

[51] Int. Cl.$^3$ .................................................. C08F 265/02
[52] U.S. Cl. ................................... 525/301; 523/201; 524/460; 525/902
[58] Field of Search ............... 525/301, 902; 523/201; 524/460

[56] References Cited
U.S. PATENT DOCUMENTS 3,282,876 11/1966 Williams .............................. 428/407
3,297,621 1/1967 Taft ..................................... 260/29.6
4,151,143 4/1979 Blank ................................... 524/533

*Primary Examiner*—Paul R. Michl
*Attorney, Agent, or Firm*—Michael B. Fein

[57] ABSTRACT

The present invention is concerned with the production and use of water-insoluble particulate heteropolymers made by sequential emulsion polymerization in dispersed particles of which a "core" of a polymeric acid is at least partially encased in a "sheath" polymer that is permeable to a volatile base, such as ammonia or an organic amine, adapted to cause swelling of the core by neutralization. The aqueous dispersion of the acid-containing core/sheath particles is useful in making water-base coating compositions wherein it may serve as an opacifying agent when a volatile base is used to at least partially (to a pH of at least 6) neutralize the heteropolymer, microvoids being formed in cores of the swollen particles in the film during the drying thereof. Thus, the heteropolymer dispersion can serve as an opacifying agent in coating compositions, such as water-base paints, as a supplement or replacement of part or all of the pigmentary material or extenders that would otherwise be used in such coating compositions.

For convenience of description herein, the terms "core", "sheath", and "core/sheath polymr" are frequently used to refer to the distinct functional components of the individual polymer particles of the essential "mode" of the heteropolymers of the present invention even though in actuality, the components of the polymer particles thereof may not have the precise arrangement implied by this terminology.

25 Claims, No Drawings

SEQUENTIAL HETEROPOLYMER DISPERSION AND A PARTICULATE MATERIAL OBTAINABLE THEREFROM, USEFUL IN COATING COMPOSITIONS AS A THICKENING AND/OR OPACIFYING AGENT

RELATED APPLICATIONS

This is a Divisional of Serial No. 158,759, filed June 12, 1980, abandoned, which is in turn a continuation-in-part of Ser. No. 52,280, filed June 26, 1979, abandoned. Another divisional of Serial No. 158,759 is being filed on even date herewith by Kowalski, Vogel, and Blankenship.

BACKGROUND OF THE INVENTION

It has heretofore been suggested to make microvoid-containing polymer particles to serve as hiding or opacifying agents in coating and molding compositions. Among the various procedures heretofore used, organic solvents and blowing agents occupy a prominent place therein.

Kreider U.S. Pat. No. 3,819,542, though containing no disclosure of the production of microvoid-containing polymer particles to serve as opacifying agents in coating compositions, is of background interest to show the use of organic solvents in a latex coating composition to produce a cellular film on drying. More specifically Kreider uses a mixture of a primary organic solvent, such as xylene, immiscible with the aqueous phase of the latex coating composition and a secondary organic solvent, such as propylene glycol, at least partially water-miscible and having lesser volatility and lesser solvating capacity for the polymer in the latex than the primary solvent. Upon evaporation of the primary solvent, a cellular film is obtained, the secondary solvent increasing the opacification.

Kershaw et al, U.S. Pat. No. 3,891,577, prepares a vesiculated polymer by converting to a solid polymer a liquid medium containing dispersed therein particles of another polymer swollen by a liquid swellant, the liquid swellant then being at least partially removed from the disperse polymer particles. The liquid medium may be converted to a solid by removal of solvent, e.g., from a solution of a solid polymer, or preferably by polymerization of a monomer or comonomers or an oligomer or a mixture of these. Optionally a dissolved polymer may be present in the liquid to be polymerized. Solidification of the liquid in which the swollen particles are dispersed and removal of the swellant is then carried out to provide the vesiculated polymer, which may be in massive form, as a film, or in the form of a coating applied to a substrate.

In another Kershaw embodiment, the dispersion of swollen polymer in the liquid medium may itself be dispersed in a further liquid in which it is insoluble. The further liquid is referred to as the suspending liquid. Solidification of the medium is then carried out and after separation of the granules so formed from the suspending liquid, liquid swellant may be removed from the swollen polymer to provide vesiculated polymer in granular form. Alternatively, when, for example, the vesiculated granules are to be used in a coating composition with which the suspending liquid is compatible, the granules formed by solidification of the medium may be incorporated into the composition as a slurry in at least part of the suspending liquid. On applying the composition to a substrate, formation of a coating film and removal of swellant from the swollen disperse polymer to form the vesicles within the granules then take place concurrently.

Whereas this U.S. Pat. No. 3,891,577 discloses a wide range of swellable disperse polymers including those containing an acid group that would be swollen by water having a pH greater than 7, e.g. water containing ammonia, and whereas it mentions that aqueous emulsion polymerization can be used to make the swellable polymer particles in a latex that can be added to a water-miscible medium to be solidified or that can be dried to form particles that can be redispersed in such a medium, nevertheless, the patent primarily depends on the process of dispersion (non-aqueous) polymerization to prepare the swellable polymer particles as pointed out in column 5, lines 28 to 53, and elsewhere in the general description, as well as in most, if not all the working examples of the patent. Such procedures are generally complicated and involve the use of organic solvents with the attendant health and fire hazards as well as the need to provide expensive solvent exhaust and/or recovery systems.

Kurth et al. U.S. Pat. No. 3,875,099 discloses preparation of sequential acrylic polymers containing 0.5-2.5% of an alpha, beta-unsaturated carboxylic acid. The bulk of the acid is introduced in the early portion of the polymerization. Of the 11 examples, only Ex. 1 superficially resembles the film-forming thickener aspect of the present invention. There is about 0.5% acid monomer over all, the first stage monomers containing about 13% methacrylic acid. The core/sheath weight ratio is in the neighborhood of 1/25. The core and sheath monomers are basically the same in this example (about 50:50 butyl acrylate methyl methacrylate), but the acid in the core confers a $T_i$ of about 30°–35° C., the sheath having a calculated $T_i$ of about 5°–10° C. Example 1 of Kurth et al. involves the use of a large amount of surfactant and a small amount of peroxy initiator, both of which are believed to normally result in extremely small latex particles. In our experience, this recipe would be expected to give core particles of about 0.04–0.05 micro average diameter, with the overall core-shell particle diameter being about 0.1–0.15 micron. The soft core, the small particle size, and the high temperature polymerization each may contribute to incomplete encapsulation. As shown by a comparative example herein below, the first stage of the Kurth et al. Ex. 1 is not adequately encapsulated.

Canadian Pat. No. 888,129 discloses the preparation of a two-stage latex dispersion of particles having a core containing a blowing agent and an encapsulating layer. The particles are subsequently heated to develop gas and foam the particles.

Krieg et al, U.S. Pat. No. 3,914,338, discloses the production of opalescent polymer particles for use in polymethyl methacrylate molding compositions consisting of a core of a crosslinked styrene emulsion polymer of a particle diameter of at least 0.8 micron and having grafted thereon, as by a subsequent stage of emulsion polymerization, a sheath of a methyl methacrylate polymer. Opalescence apparently depends on the different refractive indices of the core and sheath.

Fantl et al, U.S. Pat. No. 3,401,134 discloses that cellulose ethers and water-soluble gums have been used to thicken aqueous coating compositions based on various polymer latices to thicken the composition for application, as by brushing, rolling, or the like. Fantl et al disclose that improved aqueous polymer dispersions are obtained by delaying the incorporation of acid monomer into the copolymer until at least 70% of the other monomers have been polymerized, asserting that the acid mer units are thereby oriented to the surface of the polymer particles and the acid copolymer thus obtained has the property of increasing in viscosity when the addition of a base, such as ammonia, raises the pH to 8 to 12.

DESCRIPTION OF THE INVENTION

In accordance with the present invention, sequential emulsion polymerization in an aqueous medium has been applied to the formation of an aqueous dispersion of water-insoluble hetero-polymer particles comprising (1) an ionic core polymer containing ionizable acid groups making the core swellable by the action of a swelling agent consisting essentially of an aqueous liquid or a gaseous medium containing a volatile base to at least partially neutralize (to a pH of at least about 6 to 10) the acid core polymer and thereby to cause swelling by hydration thereof and (2) a sheath polymer on the core, the sheath being permeable to the swelling agent. The composition of sheath polymer in the preferred embodiments is such as to render it permeable at ambient temperature (e.g. at room temperature of about 20° C.) or at moderately elevated temperature, such as up to about 80° C. to about 120° C., to a volatile neutralizing base, such as ammonia, or an organic neutralizing base, such as a lower aliphatic amine, e.g., triethylamine, diethanolamine, triethanolamine, morpholine and the like, to allow swelling of the acid core polymer by such volatile bases in aqueous or gaseous media, but not permeable to fixed or permanent bases, such as sodium, potassium, calcium or magnesium hydroxide, so that films deposited from aqueous coating compositions comprising a volatile base-swollen core of the core/sheath polymer upon drying and resultant (at least partial) removal by volatilization of the base are not damaged by any permanent base present in the substrate coated or in solutions used later for cleaning the films.

The term "sequentially emulsion polymerized" or "sequentially emulsion produced" refers to polymers (which term includes copolymers as well as homopolymers) which are prepared in aqueous medium by an emulsion polymerization process wherein the dispersed polymer particles of a preformed latex or "seed" polymer in the aqueous medium are increased in size by deposition thereon of polymerized product of one or more successive monomer charges introduced into the medium containing dispersed particles of the preformed latex in one or more subsequent stages. When there is no additional emulsifier (or surfactant) introduced with the subsequent monomer charges, essentially no additional micelles are formed during the subsequent stages of polymerization and practically all of the monomer charges added later polymerize onto the latex polymer particles present at the time of charging and the resulting polymer product may appropriately be called a "unimodal" sequentially polymerized heteropolymer. However, a "polymodal", for instance a "dimodal", trimodal", or "multimodal" heteropolymer may be obtained by introducing additional emulsifier or surfactant with one (to produce a dimodal) or more (to produce tri-, tetramodal, etc.) of the subsequent charges. In such instances, the monomer charge accompanied by additional surfactant is partly polymerized on the dispersed polymer particles already present and partly polymerized on the additional micelles created by the additional surfactant, the relative proportion of the monomer charge contributing to the two effects being generally related to the amount of surfactant added with the monomer charge.

In this type of polymerization, all of the monomer of each succeeding stage or phase is attached to and intimately associated with the dispersed particles resulting from the immediately preceding stage or phase when no additional surfactant is added in the subsequent stages. When additional micelle-forming surfactant is added in a particular monomer charge, part of the monomer in the charge is so attached and intimately associated with the polymer particles present in the system at the time of monomer/surfactant addition in part produces additional dispersed particles, yielding a multimodal heteropolymer. Although the exact nature of this attachment is not known, and while it may be chemical or physical or both, the sequentially prepared polymers or copolymers of the present invention are characterized by and or made by a process in which the total particle content is substantially predetermined, in terms of number, by the use of a preformed latex to provide an initial dispersed particle content and either (1) avoiding the addition of surfactant with the subsequent monomer charges whereby a monomodal or unimodal heteropolymer is obtained containing essentially the same number of dispersed polymer particles as the initial latex or (2) incorporating a limited amount of additional emulsifying surfactant in one or more of the subsequently added monomer charges to produce a multimodal or polymodal polymer dispersion in which the number of dispersed polymer particles derived by attachment or intimate association with the dispersed polymer particles of the initial or seed latex is the essential or significant mode by virtue of its "large-size" particles and the dispersed polymer particles produced on other micelles formed by including surfactant in one or more of the subsequent monomer charges provide a second and/or third, and so on mode, all such additional modes, whether one, two, three, or more being relatively insignificant with respect to the essential mode. In multimodal polymers made in accordance with the present invention, the essential or "large-size particle" mode constitutes at least about 25% of the total amount of dispersed polymer particles in terms of weight. A preferred embodiment of multimodal product is a bimodal polymer in which the essential or significant mode derived from the dispersed particles of initial, preformed seed latex constitutes at least about 75% to 85% of the total weight. The essential mode may simply be referred to as the "main" mode regardless of the proportion of such mode in multimodal dispersion because it is the significant mode, but in the preferred embodiment the essential mode or main mode is also the predominant mode. The first stage of monomer charge containing additional surfactant to prepare a multimodal product may be at the time of any of the successive monomer charges after at least about 10% to 50% by weight of the total monomer or monomers to be polymerized on the particles of the initial preformed latex have been so polymerized.

In the multistage sequential emulsion polymerization with which the present invention is concerned, the term "seed" polymer is used to refer to an aqueous emulsion polymer dispersion which may be the initially-formed dispersion, that is the product of a single stage of emulsion polymerization or it may be the emulsion polymer dispersion obtained at the end of any subsequent stage except the final stage of the sequential polymerization. Thus, an alkali-swellable polymer which is herein intended to be provided with a sheath by one or more subsequent stages of emulsion polymerization may itself be termed a seed polymer for the next stage wherein the sheath-forming polymer is deposited on such seed polymer particles.

The core polymer may be the product of aqueous emulsion polymerization of one or more monoethylenically unsaturated monomers containing a group of the formula —HC═C< and a carboxylic acid group. Suitable acid monomers include acrylic acid, methacrylic acid, (meth)acryloxypropionic acid, itaconic acid, aconitic acid, maleic acid or anhydride, fumaric acid, crotonic acid, monomethyl maleate, monomethyl fumarate, and monomethyl itaconate.

The core polymer may be obtained by the emulsion homopolymerization of such an acid monomer or by copolymerization of two or more acid monomers. However, in preferred embodiments, an acid monomer or a mixture of acid monomers is copolymerized with one or more ethylenically unsaturated monomers of non-ionic character (that is, having no ionizable group) having one or more ethylenic unsaturated groups of the formula $H_2C$═C<.

The preferred acid monomers that may be used in providing an alkali-swellable core are acrylic acid and methacrylic acid and mixtures thereof; other preferred acid monomers that may be used include acryloxypropionic acid, methacryloxypropionic acid, acryloxyacetic acid, methacryloxyacetic acid, and monomethyl acid itaconate.

Examples of nonionic monoethylenically unsaturated monomers include styrene, vinyltoluene, ethylene, vinyl acetate, vinyl chloride, vinylidene chloride, acrylonitrile, (meth)acrylamide, various ($C_1$–$C_{20}$)alkyl or ($C_3$–$C_{20}$)alkenyl esters of (meth)acrylic acid, (The expression (meth)acrylic acid is intended to serve as a generic expression embracing both acrylic acid and methacrylic acid.) e.g., methyl methacrylate, methyl acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, and stearyl (meth)acrylate. In general, core copolymers containing at least about 5%, preferably at least 10%, by weight of acid mers have practical swellability for the purposes of the present invention but there may be instances wherein, because of the hydrophobicity of certain comonomers or combinations thereof in conjunction with the hydrophobic/hydrophilic balance of a particular acid monomer, the copolymer may require somewhat less than 5 weight percent of acid monomer or considerably more than 5 weight percent thereof, and in the latter instance, a preferred proportion of acid monomer is at least 10 weight percent based on the total weight of core-producing monomer mixture. As may be seen by the reference to homopolymerization of an acid monomer core, the invention includes a core which contains 100% of the addition polymerizable carboxylic acid. A preferred maximum quantity of acid monomer is about 70% of the total core monomers, by weight.

The core polymer may, and preferably does, comprise as one component thereof a small amount of a polyethylenically unsaturated monomer, such as ethylene glycol di(meth)acrylate, allyl (meth)acrylate, 1,3-butane-diol di(meth)acrylate, diethylene glycol di(meth)acrylate, trimethylol propane trimethacrylate, or divinyl benzene, the proportion thereof being in the range of about 0.1% to 20%, preferably 0.1% to about 3%, by weight, based on the total monomer weight of the core, the amount used generally being approximately directly proportional to the amount of acid monomer used. Butadiene is exceptional in that it often functions as a monoethylenically unsaturated monomer especially in mixtures with styrene so the amount of butadiene, if used, may be as much as 30 to 60 percent by weight of the total core monomer weight.

While the core may be made in a single stage or step of the sequential polymerization and the sheath may be the product of a single sequential stage or step following the core stage, nevertheless, the making of the core component may involve a plurality of steps in sequence followed by the making of the sheath which may involve a series of sequential steps as well.

Thus, the first stage of emulsion polymerization in the process of the present invention may be the preparation of a seed polymer containing small dispersed polymer particles insoluble in the aqueous emulsion polymerization medium. This seed polymer may or may not contain any acid component but provides particles of minute size which form the nuclei on which the core polymer of acid monomer, with or without nonionic comonomer(s), is formed.

As is common to aqueous emulsion polymers, there is used a water-soluble free radical initiator, such as hydrogen peroxide, tert-butyl peroxide, or an alkali metal (sodium, potassium or lithium) or ammonium persulfate or a mixture of such an initiator with a reducing agent, such as a sulfite, more specifically an alkali metal metabisulfite, hydrosulfite, or hyposulfite, or sodium formaldehyde sulfoxylate, to form a redox system. The amount of initiator may be from 0.01 to about 2% by weight of the monomer charged and in a redox system, a corresponding range (0.01 to about 2%) of reducing agent may be used. The temperature may be in the range of about 10° C. to 100° C. In the case of the persulfate systems, the temperature is preferably in the range of 60° to 90° C. In the redox system, the temperature is preferably in the range of 30° to 70° C., preferably below about 60° C., more preferably in the range of 30°–45° C. The proportion of emulsifier may be zero, in the situation wherein a persulfate initiator is used, to about 0.3 weight percent, based on the weight of monomer charged to the first stage of polymerization. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low. However, as pointed out hereinabove, polymodal products may be obtained by including an emulsifier or surfactant in one or more of the later monomer charges.

Any nonionic or anionic emulsifier may be used, either alone or together. Examples of the nonionic type of emulsifier include tert-octylphenoxyethylpoly(39)-ethoxyethanol, and nonylphenoxyethylpoly(40)ethoxyethanol. Examples of anionic emulsifiers include sodium lauryl sulfate, sodium dodecyl benzene sulfonate, tertoctylphenoxyethoxypoly(39)ethoxyethyl sulfate, sodium salt.

The molecular weight of the polymer formed in a given stage may range from 100,000, or lower if a chain transfer agent is used, to several million viscosity average. When 0.1 to 20 weight % of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistage polymer is treated with a swellant for the core. If it is desired to produce an acid polymer having a molecular weight in the lower part of the range, such as from 500,000 down to as low as about 20,000, it is frequently most practical to do so by avoiding the polyethylenically unsaturated monomers and using a chain transfer agent instead, such as 0.05 to 2% or more thereof, examples being a lower alkyl mercaptan, such as sec-butyl mercaptan.

The acid-containing core polymer, whether obtained by a single stage process or a process involving several stages, has an average size of about 0.05 to about 1.0, preferably 0.1 to 0.5, more preferably 0.2 to 0.5 micron diameter in unswollen condition. If the core is obtained from a seed polymer, whether or not the latter contains acid groups or mers, the seed polymer may have an average size in the range of 0.03 to 0.2 micron diameter.

After the acid core is obtained, a subsequent stage or stages of emulsion polymerization is effected to form a sheath polymer on the acid core polymer particles or micelles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the sheath, the tendency to produce gum or coagulum in the reaction medium may be reduced or prevented by the addition of about 0.05 to about 0.5% by weight, based on sheath-forming monomer weight, of emulsifier without detriment to the deposition of the polymer formed on the previously formed core particles.

The monomers used to form the sheath polymer on the acid core particles may be any of the nonionic monoethylenically unsaturated comonomers mentioned hereinbefore for the making of the core. The monomers used and the relative proportions thereof in any copolymers formed should be such that the sheath thereby formed is permeable to an aqueous or gaseous volatile basic swellant for the acid core but not to a permanent base. In spite of their hydrophobicity, the extremely non-polar or low-polar monomers, namely, styrene, α-methyl styrene, vinyl toluene, ethylene, vinyl chloride and vinylidene chloride are useful alone (except in the first stage of sheath formation) or in admixture with more highly polar monomers in the list, such as vinyl acetate. Monomeric mixtures for making the sheath may contain up to about 10% by weight, but preferably not over 5% by weight, of an acid monomer, such as one of the monomeric acids mentioned hereinbefore for making the core. However, the proportion of acid in the sheath polymer should not exceed one-third the proportion thereof in the core polymer. The content of acid monomer serves either or both of two functions, namely stabilization of the final sequential polymer dispersion and assuring permeability of the sheath to a volatile base swellant for the core.

The amount of polymer deposited to form sheath polymer is generally such as to provide an overall size of the multistage polymer particle of about 0.07 to about 4.5 microns, preferably about 0.1 to about 3.5 microns, more preferably about 0.2 to about 2.0 microns, in unswollen condition (that is, before any neutralization to raise the pH to about 6 or higher) whether the sheath polymer is formed in a single stage or in a plurality of stages. In unswollen state, the ratio of core weight to the total weight on average is from 1:4 to 1:100, preferably 1:8 to 1:50. After volatilization of the water and volatile base, e.g. $NH_3$, from the enlarged, swollen particle, to produce a microvoid therein, the ratio of void volume to total volume of the particle on average should be from about 5% to 95% and preferably is at least 15%. Generally, a single void is formed in each particle.

The multistage heterogeneous particulate polymer containing the acid core is swollen when the particles are subjected to an aqueous basic swellant that permeates the sheath and expands the core, which expansion may involve partial merging of the outer periphery of the core into the pores of the inner periphery of the sheath and also partial enlargement or bulging of the sheath and the entire particle overall. When the swellant is removed by drying, the shrinkage of the core tends to develop a microvoid, the extent of which depends on the resistance of the sheath to restoration to its previous size. Suitable swelling agents for acid-containing cores are ammonia, ammonium hydroxide, or a volatile lower aliphatic amine, such as trimethylamine, and triethylamine.

The monomer or monomers of the sheath may be selected to produce a sheath polymer having a relatively moderate to high glass transition temperature. $T_i$ is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg/cm$^2$.

As indicated elsewhere herein, the core is preferably relatively hard, as indicated by calculted or measured core $T_i$, or the core polymer is crosslinked by a polyunsaturated monomer. A useful limit for hardness (or softness) of the core is that less than 40% of butyl acrylate ($T_i$ of between $-50°$ and $-55°$ C.) is used, or no more than an amount of an equivalent monomer is used which would give a comparable $T_i$ when using the same comonomer combination. Thus, for a copolymer of 40% butyl acrylate and 60% methyl methacrylate, the calculated $T_i$ is about 20° C. When ethyl acrylate is substituted for butyl acrylate, a copolymer of 60% ethyl acrylate and 40% methyl methacrylate gives a calculated $T_i$ of about 17° C. Of course, the acid monomer confers a higher $T_i$. When using different monomer compositions, particularly with crosslinkers, this ruleof-thumb is not always strictly applicable. Nevertheless, it is a useful guideline.

Opacifier

It is preferred, for formation of microvoids, to select the monomer or monomers and the relative proportions thereof in the sheath-producing stage to produce a sheath polymer having a $T_i$ of at least 25° C., and preferably between 50° and 100° C. The swelling and subsequent removal of the swelling agent in this instance favors the formation and retention of the microvoids. The swelling may be carried out at a temperature corresponding to the $T_i$, or somewhat above it, to favor rapid penetration of the swelling agent through the sheath to swell the core and by softening the sheath, to allow the core greater freedom of expansion against the confinement by the sheath. After expansion by the swellant to the desired extent, the expanded particles are cooled to a temperature below their $T_i$ to set the sheath and then the swellant is removed (at least partially) from the particles by drying at the lower temperature, resulting in the formation of microvoids in the cores of the particles. For best results to obtain microvoids, it is important to remove water rapidly from the cores. Slow drying at high humidity may be detrimental to microvoid formation.

In another preferred embodiment the sheath is crosslinked by including in the monomer mixture used for forming the sheath about 1% to 50% by weight, based on the total monomer weight in the mixture, of a polyethylenically unsaturated monomer such as one of those mentioned hereinbefore for making the core polymer. The crosslinking of the sheath serves to render it more stable structurally so that on drying the swollen paricles to remove swellant, the shrinkage of the swollen core produces microvoids therein but the sheath resists collapse so that the microvoids formed are essentially retained within the particle which also remains essentially in spherical shape. One method involving the formation of a crosslinked sheath is to swell the dispersed polymer-particles by neutralization of the acid-containing core just before the stage of polymerizing the crosslinked phase of the sheath, or before completion of this stage when the content of polyethylenically unsaturated monomer therein is over about 5 weight percent of the monomer mixture used therein, so that the last mentioned stage is carried out on the swollen particles and favors retention of the structure when voids are produced on subsequent removal of swellant.

In this last-mentioned embodiment wherein the sheath is crosslinked, this may be effected in a single sheath-forming stage or it may be effected by using a multistage sheath-forming procedure in which the polyethylenically unsaturated crosslinking monomer is omitted from the first sheath-forming monomer mixture but is included in the monomer mixture used in a later stage, such as the second or third stage. It is remarkable that even in this multistage procedure, the crosslinking frequently occurs at the interface between the acid core and the surrounding sheath so that the expanded structure of the sheath tends to be maintained upon removal of the ammonia or other swellant from the core, thereby favoring the development of microvoids in the core.

The multiple-stage core-sheath polymer dispersions of the present invention are useful for aqueous coating and impregnating compositions, such as those of U.S. Pat. No. 2,795,564 supra, as opacifying agents in such compositions either as a supplement to, or replacement of, pigmentary matter and/or extenders therefor. For these purposes, the aqueous dispersions of the core-sheath polymer may be added directly to the coating and/or impregnating compositions. Alternatively, the core/sheath polymers may be isolated from the dispersions, after swelling of their cores, by filtration or decantation, and then the swellant may be removed, as by drying or volatilization, under conditions such that microvoids are formed and retained in the individual polymer particles or granules, the latter being more or less free-flowing in character so that they can be packaged, sold and shipped or stored before use. The dry powder thus obtained can also be used in coatings based on organic solvents provided the sheath component of the core-sheath particles is not soluble in the organic solvent.

In one modification, the acidic-core/sheath polymer particles having a $T_i$ of 50° C. or higher, and/or a crosslinked sheath layer may be provided with an outer uncrosslinked relatively softer, film-forming layer having a $T_i$ of about 17° to 20° C. or lower so that the outer surfaces of these particles will coalesce, at their juncture with each other and/or with the main binder polymer having a $T_i$ around room temperature or lower, upon drying at normal room temperatures. When the particles comprise a hard (especially $T_i$ of at least 50° C. to 100° C.) sheath layer, the uncrosslinked relatively softer exterior layer should have a $T_i$ less than 50° C., and at least 10° C., preferably 20° C., lower than that of the hard layer. This embodiment is useful in water-base house paints and industrial coatings wherein the core/sheath polymer may serve as part of the binder when applied at ambient temperatures or at somewhat higher temperatures followed by a baking step. As stated previously swelling by ammonia or a lower amine generally requires the heating of the polymer dispersion sufficiently to allow expansion of the sheath while aiding penetration by the volatile base. When crosslinked sheath layer(s) is involved, the swelling by a volatile base is effected prior to completion of the polymerization of the crosslinking monomer mixture.

In addition to the importance $T_i$, the MFT of is important. MFT is the minimum film-forming temperature of the latex particles as the coating is dried, and is determined by the method described in Resin Review, Volume 16, No. 2 (1966), with the following modification. The MFT of a conventional latex is quite easy to identify visually on a thin film that is deposited on a temperature gradient bar. It is the temperature at which film cracking ceases and the film becomes continuous and clear. However, with the latices of this invention, deposited films may be relatively free of cracking over the entire temperature range. Visually, the latices may display no transition from opaque film to translucent film to clear-film as one proceeds toward the high temperature end of a temperature gradient bar as would be the case with a simple thermoplastic latex particle of uniform composition. Consequently, the visual observations may be augmented by scraping at the deposited film with a sharp instrument, such as the edge of a metal spatula, to determine the temperature at which the deposited film achieves good strength and integrity. This allows a more definite identification of the temperature at which there is a transition from a translucent film to a clear, continuous film. This is influenced not only by the $T_i$ of the addition copolymer, but by polymer composition and other ingredients such as plasticizers or coalescing agents, if used, and their amounts, the plasticizing effect of water, etc. Such additives to paints thus make shells, having a $T_f$ of greater than ambient temperature, film-forming at the desired temperature. The MFT of course is important only to the coalescable, film forming aspect of the invention, and not to the aspect wherein the outer shell is non film forming.

Besides being useful in water-based paints based on vinyl or acrylic polymer latices or aqueous solutions of vinyl or acrylic polymers, to replace all or part of opacifying pigments heretofore used, especially those of titanium dioxide, the microvoid-containing particulate polymers of the present invention may be used for similar purposes in other coating systems including resin-forming condensation products of thermosetting type, such as phenoplasts and aminoplasts, including urea-formaldehyde and melamine-formaldehyde, and other condensates, e.g., water-dispersible alkyd resins. In addition, polymodal heteropolymers of the present invention having a predominant proportion of the microvoid-containing large mode and a relatively minor proportion of a small mode can serve not only the opacifying function of the main large mode but also provide an adhesion-promoting action by way of the small mode or modes.

In the following examples which are illustrative of the invention, the parts and percentages are by weight and temperatures are in degrees Celsius, unless otherwise stated.

EXAMPLE 0

Emulsion Polymerization of Seed Polymers (a) A 5-liter flask equipped with a paddle stirrer, thermometer, nitrogen inlet and reflux condenser is used. Deionized water (2900 g) and 5.5 g of sodium dodecylbenzene sulfonate are heated in the flask to 78° C. under a nitrogen atmosphere with stirring. A monomer emulsion is prepared from 266 g of deionized water, 0.40 g of sodium dodecylbenzene sulfonate, 416 g of butyl acrylate, 374 g of methyl methacrylate and 10.4 g of methacrylic acid. Fifty grams of monomer emulsion is added to the flask and then 3.0 g of ammonium persulfate dissolved in 10 ml. of water. Fifteen minutes later, a gradual feed of the remaining monomer emulsion at 16 g/min. is begun. The temperature is allowed to rise to 85° C. and is maintained there throughout the monomer addition. Fifteen minutes after the monomer addition is completed, the reaction mixture is cooled. At 55° C., 1.0 ml of t-butyl hydroperoxide (70%) and 0.50 g of sodium formaldehyde sulfoxylate dissolved in 20 g of water are added. At 25° C., 10 g of 28% aqueous ammonia is added. The product is filtered through a 100-mesh screen and has pH 9.5, 19.6% total solids and average particle diameter 0.06 micron (light scatter).

(b) A larger seed polymer dispersion is prepared by the same procedure, only the amount of sodium dodecylbenzene sulfonate in the initial charge to the flask is reduced to 2.0 g. The product has a pH of 9.4, 19.5% total solids, and an average particle diameter of 0.095 micron.

EXAMPLE 1

A. A 5-liter round-bottomed flask is equipped with paddle stirrer, thermometer, nitrogen inlet and reflux condenser. To 2115 g. of deionized water heated to 84° C. in the flask under a nitrogen atmosphere there is added 4.2 g. of sodium persulfate dissolved in 25 g. of water followed by 62 g. of an acrylic seed polymer dispersion of part (b) of Example 0 (19.5% solids, average particle diameter 0.095 micron). A monomer emulsion consisting of 235 g. of deionized water, 0.8 g. of sodium dodecylbenzene sulfonate, 490 g. of methyl methacrylate, 210 g. of methacrylic acid and 3.5 g. of ethylene glycol diacrylate is added to the kettle over a 3-hour period at 85° C. After the completion of the monomer feed, the dispersion is held at 85° C. for 30 minutes, cooled to 25° C. and filtered to remove coagulum. The filtered dispersion has a pH 2.3, 22.4% solids content and an average particle diameter of 0.35 micron. A dilute sample of the dispersion is neutralized to pH 10 with ammonia. Upon examination with an optical microscope, the average particle diameter is found to be 0.8 micron corresponding to a swelling ratio of around 12 by volume.

B. To 80 parts of water heated to 85° C. in a stirred reaction kettle is added 0.07 parts of sodium persulfate and then 4.5 parts of the polymer dispersion of part (A) above (1 part of solid polymer). Eighteen parts of methyl methacrylate is added over a 1-hour period while maintaining the temperature at 85° C. The temperature is maintained at 85° C. until greater than 98% of the monomer has reacted. The product dispersion when examined with an optical microscope is found to consist of individual spherical particles with average diameter 1.0 micron showing that the polymethyl methacrylate is formed as a layer or sheath about the core obtained in part A.

Upon titration of a sample of dispersion potentiometrically with 0.5 N potassium hydroxide, no carboxylic acid is shown on the titration curve. The first stage polymer of part A. upon similar titration shows all of the theoretical carboxylic acid (3.5 meq. per g. of solid polymer). The zero titer of acid, after the polymerization of the methyl methacrylate, shows that the first stage core A. is well encapsulated by the second stage namely the product of part B.

C. A sample of the two-stage polymer of part B. is neutralized with an equivalent amount of (0.18 meq/g of solid polymer) ammonium hydroxide. After 24 hours, the average particle diameter is still 1.0 micron showing that little or no swelling occurs. The neutralized dispersion is heated to 95° C. for 1 hour and cooled to room temperature; the average particle diameter is then found to be 1.15 micron showing that swelling has occurred. Samples of the swollen and unswollen two-stage dispersions are allowed to evaporate to dryness. The dry powders are immersed in hydrocarbon oil ($n_D = 1.51$) and examined with an optical microscope. The unswollen particles are almost invisible because of the very small index of refraction difference between the polymer and oil. In contrast, the swollen particles show dark circles with average diameter 0.8 micron because of the voids inside the particles; the polymer shells around the voids are invisible. Transmission electron micrographs of the dry two-stage polymer before and after swelling are taken: the unswollen particles appear as dark silhouettes due to absorption of the electron beam by the polymer; the swollen particles under the identical conditions have light spots in their centers because the electrons are not absorbed by the voids.

In a similar fashion, a sample of two-stage polymer from part B. is neutralized with an equivalent amount of triethylamine and heated to 95° C. for one hour. The sample swells on heating and forms voids which remain after drying.

EXAMPLE 2

A blend of the ammonia-swollen polymer dispersion from part C. of Example 1 (1 part of solids) and a commercially available acrylic film-forming latex (Rhoplex$^R$ AC-64, 3 parts of solids) is drawn down over an opacity chart (The Leneta Company, Form 5C). The dry film (1.0 mil thick) is whitish. A Kubelka-Munk scattering coefficient (S) is determined by the method of P. B. Mitton and A. E. Jacobson (Off. Digest, Sept. 1963, p. 871-911) and is found to be 0.4/mil. For comparison, the unswollen two-stage polymer obtained in part B. of Example 1 is incorporated in a film in the same manner. The dry film is clear (S=0.0/mil). The light-scattering of the film containing the swollen two-stage polymer is due to voids in the film. The voids can be seen with an optical microscope; the average void diameter is 0.8 micron.

EXAMPLES 3-5

A series of two-stage polymers is prepared using the polymer dispersion prepared in part A. Example 1 as the first stage. The second stage is polymerized by the procedure of part B. of Example 1 substituting for 18 parts of methyl methacrylate the parts of monomers shown in Table I. The two-stage polymer dispersions are examined for encapsulation by optical microscopy and by titration as in part B. of Example 1. The titration results are given in Table I as a percentage of the theoretical weak (carboxylic) acid titer as calculated from the overall composition of the two-stage polymer. The two-stage dispersions are treated with ammonia and heated as in part C. of Example 1 and examined for void formation as in the same example. The results are given in Table I.

TABLE I

| Example | Monomer[1] (parts) | Two-Stage Polymer Before Swelling | | Microvoid Formation[2] |
|---|---|---|---|---|
| | | Appearance (microscope) | Weak Acid Titer % of Theory | |
| 3 | 4 MMA | OK | 2 | Yes |
| 4 | 12 S + 6 AN | OK | 0 | Yes |
| 5 | 18 i-BMA | OK | 0 | Yes[3] |

[1]MMA = methyl methacrylate
S = Styrene
AN = acrylonitrile
i-BMA = isobutyl methacrylate
[2]After swelling at 95° C. and drying at 25° C.
[3]Some collapsed particles

EXAMPLE 6

A series of two-stage polymer dispersions with the same composition but varying particle size is prepared by the procedure of Example 1A and B. The composition of the first stage is the same as that of Example 1A while the composition of the second stage is 24 parts of methyl methacrylate, 12 parts of isobutyl methacrylate and 0.4 part of methacrylic acid for every part of first stage polymer. The particle size is varied by choosing initial seeds of different sizes for the polymerization of Example 1A. The two-stage polymer dispersions are swollen by ammonia treatment as in part C. of Example 1. Average particle diameter of the swollen two-stage polymers and void diameter of the swollen particles after drying are determined by microscopy. The swollen polymer dispersions are blended with a commercial acrylic latex (Rhoplex$^R$ AC-64) and Kubelka-Munk scattering coefficients are measured on the dried films as described in Example 2. Thick (50 mil) film castings of the same blends are prepared along with castings of blends of the unswollen two-stage polymers with the same acrylic latex (again 1 part of two-stage polymer solids to 3 parts of acrylic latex solids). The densities of the thick film castings are measured by buoyancy in silicone oil, and from the differences in density between the films containing the swollen two-stage polymers (and hence microvoids) and those containing unswollen two-stage polymers (no microvoids) the volume of microvoids in the film are calculated. The Kubelka-Munk scattering coefficient(s) for each swollen two-stage polymer blend is adjusted to unit concentration of microvoids; the results are presented in Table II. The percentage of void volume in the films ranges from 1.7-4.5. The scattering efficiency per unit concentration of voids goes through a maximum at an average void diameter of around 0.22 micron in agreement with the theoretical calculations of Ross (Ind. Eng. Chem., Prod. Res. Develop. 13, p. 45-49 (1974)) for the scattering efficiency of spherical bubbles in a plastic matrix.

TABLE II

| Average Particle Diameter, (micron) | Average Void Diameter, (micron) | Acrylic Latex Films | | |
|---|---|---|---|---|
| | | S/mil | % Void in Film | S/micron/ Unit Concentration |
| 00.28 | 0.13 | 0.04 | 1.7 | 0.10 |
| 0.41 | 0.20 | 0.16 | 2.0 | 0.32 |
| 0.45 | 0.22 | 0.21 | 2.1 | 0.39 |
| 0.50 | 0.26 | 0.23 | 3.7 | 0.25 |
| 0.56 | 0.30 | 0.18 | 3.0 | 0.24 |
| 0.63 | 0.33 | 0.18 | 3.9 | 0.24 |
| 0.78 | 0.40 | 0.25 | 4.5 | 0.22 |
| 0.94 | 0.46 | 0.23 | 4.5 | 0.20 |

EXAMPLE 7

The procedure of part B. of Example 1 is used to deposit a second stage of a crosslinked polymer of a mixture of styrene and divinylbenzene on the swollen two-stage core-sheath polymer of Example 3. The amount of Example 3 polymer dispersion used is that containing 10 parts of polymer solids with 4 parts of styrene and 4 parts of divinylbenzene (55% purity commercial grade). The final average particle diameter is 0.8 micron. Upon drying the swollen particles, voids form having an average diameter of 0.6 micron.

EXAMPLE 7B

The procedure of part B of Example 1 is used to deposit a second stage of uncrosslinked polystyrene on the swollen two-stage core-sheath polymer of Example 3. The amount of Example 3 polymer dispersion used is that containing 5 parts of polymer solids to which is added 40 parts of styrene monomer. The final average particle diameter is 1.0 micron. Upon drying the swollen particles, voids form having an average diameter of 0.6 microns.

EXAMPLE 8

The procedure of part B of Example 1 is used to deposit a second stage of a butyl acrylate methylmethacrylate copolymer on the core-sheath polymer dispersion of Example 1B. The amount of Example 1B dispersion used is that containing 19 parts polymer solids with 10 parts of butyl acrylate and 8 parts of methyl methacrylate. The reulting core/sheath polymer is swollen with ammonia by the procedure of part C of Example 1. The swollen dispersion forms tough, whitish films upon drying at 25° C. having microvoids with average diameter of 0.8 micron.

EXAMPLE 9

An alkali-swellable polymer dispersion with an average particle diameter of 0.12 micron is prepared by the procedure of part A of Example 1 except that 350 g. of a 40% solids acrylic polymer dispersion with an average diameter of 0.06 microns is used as the seed polymer. The resulting alkali-swellable polymer is used as a seed, that is an alkali swellable core, for the following three polymerizations to form a sheath thereon:

A. Twenty parts of monomer with composition by weight 35% isobutyl methacrylate, 64% methyl methacrylate and 1% methacrylic acid is polymerized for every one part of solid alkali-swellable seed by the procedure of part B of Example 1. The resulting two-stage polymer dispersion is swollen after ammonia treatment as in part C of Example 1.

B. Same as A but 24 parts of monomer is used instead of 20.

C. Same as A but only 8 parts of monomer is used. The resulting swollen polymer dispersion (9 parts of solids) is used as a seed for the further polymerization of 8 parts of a mixture of styrene and trimethylolpropane trimethacrylate (TMPTMA), 95/5 (W/W) by the procedure of part B of Example 1.

The three swollen polymers have average particle diameters of 0.35–0.40 micron. They are dried and immersed in oil as in part C of Example 1. All three samples thus treated contain voids with average diameters around 0.25 micron.

The three swollen polymer dispersions are formulated into three paints 9A, 9B, and 9C respectively. A solid polymethyl methacrylate (PMMA) dispersion of the same particle size range (0.35–0.40 micron) is formulated into a paint in the same way as a control: A pigment grind is prepared from 140 parts (by weight) of propylene glycol, 47 parts of Tamol$^R$ 731 (sodium salt of 50/50 molar ratio copolymer of maleic anhydride and diisobutylene), 2 parts of a defoamer (Nopco$^R$ NDW), 40 parts of water and 868 parts of titanium dioxide pigment (Ti-Pure$^R$ R-900); the pigment grind is blended with the appropriate amount of the above swollen polymer dispersions and a commercial acrylic latex paint vehicle (Rhoplex$^R$ AC-382) so that the dry paint films would be 14% by volume titanium dioxide, 25% by volume of the above swollen polymer dispersions and 61% binder by volume. Texanol$^R$ is added to the paints (5% on solid Rhoplex$^R$ AC-382) as a film coalescent. The paints are drawn down on opacity charts and scattering coefficients are determined on the dry films (1 mil thick) as in Example 2. The results (Table III) show that, compared to a corresponding paint pigmented with only 14% titanium dioxide by volume, the solid PMMA adds 0.5 mil$^{-1}$ to the scattering coefficient, swollen sample A contributes the same, swollen sample B with more encapsulating polymer than sample A contributes 0.7 mil$^{-1}$, while sample C with less encapsulating polymer than A or B contributes 1.2 mil$^{-1}$. Sample C is accordingly the best opacifying agent.

TABLE III

| Sample | S/mil | Difference in S/mil (compared to TiO$_2$ alone) |
|---|---|---|
| 9A | 6.1 | 0.5 |
| 9B | 6.3 | 0.7 |
| 9C | 6.8 | 1.2 |
| PMMA (solid) | 6.1 | 0.5 |
| None (14% TiO$_2$ by volume only) | 5.6 | — |

The following gives additional examples of variations in core compositions in these cases using the non film-forming opaque pigment-like aspect of the invention.

EXAMPLE 10 High sheath/core ratio (84/1)

Example 7B is repeated only the amount of styrene is increased to 80 parts. The final average particle size is 1.2 microns and the dry particles contain voids having an average diameter of 0.6 micron.

EXAMPLE 11 Poly(vinyl chloride) sheath

The procedure of part B of Example 1 is used to deposit an additional stage of poly(vinyl chloride) on the swollen two-stage, core-sheath polymer of Example 3. A stainless steel pressure reactor is used. The amount of polymer dispersion employed from Example 3 is that containing 5 parts of polymer solids. Fifty parts of vinyl chloride monomer is pumped into the reactor under pressure over a 90 minute period. The reaction temperature is maintained at 80° C. The final average particle diameter is 1.0 micron. The average void diameter of the dry particles is 0.6 micron.

EXAMPLES 12a–12i

A series of nine alkali swellable core polymer dispersions was prepared using seed polymers of three different sizes prepared by the general recipe of Example 0. Two basic procedures were used for the alkali swellable polymers: a redox procedure for those polymers containing vinyl acetate and a thermal procedure for those not containing vinyl acetate.

Redox Procedure

A 5-liter flask was equipped with a paddle stirrer, thermometer, nitrogen inlet and reflux condenser. Deionized water (2700 g.), 0.8 g. of acetic acid and 0.030 g. of ferrous sulfate heptahydrate were heated to 75° C. under a nitrogen atmosphere. Sodium persulfate (0.8 g.) and 0.8 g. of sodium sulfoxylate formaldehyde were added to the kettle followed by the seed polymer dispersion (amount given in the table). A monomer emulsion (prepared from 800 g. of total mixed monomer, 275 g. of water, 2.0 g. of sodium dodecylbenzene sulfonate and 3.2 g. of sodium acetate) was added to the flask over a 2-hour period along with a cofeed of 2.4 g. sodium persulfate dissolved in 100 g. of water and a cofeed of 2.4 g. of sodium bisulfite dissolved in 100 g. of water, maintaining the reaction temperature at 71°–73° C. When the feeds were complete, the temperature was held at 71°–73° C. for 15 minutes and then the flask was cooled. At 55°–60° C., 1.6 g. of t-butyl hydroperoxide was added to the flask and then 1.0 g. of sodium sulfoxylate formaldehyde dissolved in 10 ml. of water.

Thermal Procedure

To the same reaction apparatus used for the redox process above was added 2900 g. of deionized water and 4.0 g. of sodium persulfate. The kettle and contents were heated to 82° under a nitrogen atmosphere and then the seed polymer dispersion (amount given in table) was added. A monomer emulsion (prepared from 800 g. of total mixed monomers, 275 g. of water and 2.0 g. of sodium dodecylbenzene sulfonate) was added to the flask over a 2-hour period while maintaining the reaction temperature at 80°-82° C. When the addition of monomer was complete, the temperature was maintained at 80°-82° C. for 30 min. before cooling the dispersion to room temperature.

All alkali swellable dispersions were filtered through a 100-mesh screen to remove coagulum. The solids content of the dispersions was measured and was 19.5-20.0%. Average particle diameters were measured by auto correlation spectroscopy (Coulter Nano-Sizer TM) or optical microscopy. The average particle diameters of all nine dispersions increased measurably when neutralized to pH 10 with ammonia. The nine alkali swellable polymer preparations are summarized in the Table.

temperature was held at 79°-81° C. for an additional 15 minutes and then aqueous ammonia (1.5 equivalents for every equivalent of core and sheath carboxylic acid) was added. The dispersion was held at 90° C. for one hour, cooled to room temperature, and filtered through a 100-mesh screen. The solids contents were 19.0-19.5%.

Redox Procedure

The same recipe and procedure was used as for the thermal procedure with the following exceptions. Ferrous sulfate heptahydrate (0.015 g.) was added to the initial kettle charge and the amount of alkali swellable seed dispersion was increased to 50 g. of solid polymer (250 g. of dispersion, sheath/core ratio of 8/1). The polymerization temperature was maintained at 59°-61° C. A cofeed of 1.0 g. of sodium bisulfite dissolved in 50 g. of water was used; 5 ml. of this solution was added to the kettle just before the start of the monomer feed and the remainder was added along with the monomer but TABLE for Example 12

| Example Number | Monomer Composition[1] (Weight Percent) | Seed Polymer Diameter Microns | Seed Polymer Amount (g. of solid) | Procedure | Core Product Av. Particle Diam., Microns |
|---|---|---|---|---|---|
| 12a | 80 VAc/15 VCl₂5 AA | 0.095 | 70 | Redox | 0.23 |
| 12b | 95 VAc/5 AA | 0.095 | 70 | Redox | 0.22 |
| 12c | 95 VAc/5 Crotonic Acod | 0.14 | 40 | Redox | 0.24 |
| 12d | 80 VAc/15 DBM/5 AA | 0.095 | 70 | Redox | 0.23 |
| 12e | 79.5 EA/20 MHI/0.5 BGDMA | 0.14 | 40 | Thermal | 0.30 |
| 12f | 30 S/30 MMA/40 MAA | 0.095 | 18 | Thermal | 0.27 |
| 12g | 5 BA/55 MMA/40 AOPA | 0.12 | 22 | Thermal | 0.40 |
| 12h | 10 BA/9.5 MMA/80 MAA/0.5 BGDMA | 0.14 | 18 | Thermal | 0.30 |
| 12i | 5 BA/45 S/20 AN/30 MAA | 0.095 | 18 | Thermal | 0.27 |

[1]VAc = vinyl acetate,
VCl₂ = vinylidene chloride,
AA = acrylic acid,
DBM = dibutyl maleate,
EA = ethyl acrylate,
MHI = methyl hydrogen iticonate,
BGDMA = 1,3-butylene glycol dimethyacrylate = monomer X-970,
S = styrene,
MMA = methyl methacrylate,
MAA = methacrylic acid,
BA = butyl acrylate,
AOPA = β-acryloxypropionic acid,
AN = acrylonitrile.

EXAMPLES 13a-13i

Encapsulation of 12a-i swellable cores with hard acrylic sheath (20 BMA/78 MMA/2 MAA, sheath).

The nine different alkali swellable polymer dispersions of Example 12 were used as cores for the polymerization of a hard sheath composition (20% butyl methacrylate/78% methyl methacrylate/2% methacrylic acid) to give core/sheath weight ratio of ⅛ to 1/40 employing one of the two initiation procedures given below.

Thermal Procedure

Deionized water (1500 g.), 2.0 g. of sodium persulfate and 0.5 g. of sodium dodecylbenzene sulfonate were heated to 82° C. in a 3-liter flask equipped with a paddle stirrer, thermometer, reflux condenser, and nitrogen inlet. The alkali swellable core polymer (25 g. of solid, 125 g. of dispersion, 16/1 sheath/core ratio or 10 g., 50 g. of dispersion, 40/1 sheath/core ratio) was added to the kettle and then a monomer emulsion of 135 g. of water, 0.2 g. of sodium dodecylbenzene sulfonate, 80 g. of butyl methacrylate, 312 g. of methyl methacrylate and 8 g. of methacrylic acid was added over a 2-hour period maintaining the temperature at 79°-81° C. The finishing 10 minutes after the monomer addition was complete. The temperature was maintained at 59°-61° C. for 15 min. after the end of the cofeed and then the ammonia was added. The dispersion was held at 90° C. for one hour. The solids contents were 18.5-19.0%.

Optical microscopy was used to estimate the average particle diameters and void diameters (see Example 1C) of the nine swollen core-sheath dispersions. Anion exchange resin (Amberlite IR-120) was used to remove ammonia from the continuous phase and from the cores, and then the dispersion was titrated potentiametrically with 0.5 N potassium hydroxide. Some of the shell carboxylic acid (25-35%) was titrated but little or none of the core carboxylic acid, showing good encapsulation of the core by the sheath. The nine core sheath-polymers are summarized in the table.

TABLE for Example 13

| Example No. | Process | Sheath/Core Ratio | Average Particle Diameter, Microns | Average Void Diameter, Microns |
|---|---|---|---|---|
| 13a | Redox | 8/1 | 0.43 | 0.24 |
| 13b | Redox | 8/1 | 0.50 | 0.35 |
| 13c | Redox | 8/1 | 0.50 | 0.24 |
| 13d | Redox | 8/1 | 0.45 | 0.30 |

TABLE for Example 13-continued

| Example No. | Process | Sheath/Core Ratio | Average Particle Diameter, Microns | Average Void Diameter, Microns |
| --- | --- | --- | --- | --- |
| 13e | Redox | 8/1 | 0.58 | 0.37 |
| 13f | Thermal | 16/1 | 0.62 | 0.38 |
| 13g | Thermal | 16/1 | 0.90 | 0.55 |
| 13h | Thermal | 40/1 | 0.55 | 0.35 |
| 13i | Thermal | 16/1 | 0.67 | 0.35 |

EXAMPLE 14 Vinylidene chloride sheath

To a glass reaction apparatus containing 730 parts of water stirred under nitrogen at 80° C. is added 2.7 parts of sodium persulfate dissolved in 30 parts of water and then 80 parts of an alkali swellable polymer dispersion (5 butyl acrylate/55 methyl methacrylate/40 methacrylic acid by weight, 30% solids content, 0.13 micron particle diameter, made by the procedure of part A, Example 1). A monomer emulsion of 57 parts of water, 0.10 g. sodium dodecylbenzene sulfonate, 43 parts of butyl methacrylate, 169 parts of methyl methacrylate and 4.4 parts of methacrylic acid is added over a 75-min. period maintaining the temperature at 80° C. Then 17 parts of 28% aqueous ammonia is added and 15 minutes later the addition of a monomer emulsion of 72 parts of water, 0.25 parts of sodium dodecylbenzene sulfonate and 216 parts of styrene is begun still maintaining 80° C. The styrene addition if complete in 75 minutes. Then 2 parts of sodium persulfate dissolved in 100 parts of water is added and the temperature is maintained at 80° C. for 30 minutes. Then 625 parts of water, 1.6 parts of t-butyl hydroperoxide and 16 parts of an aqueous solution containing 0.15% ferrous sulfate heptahydrate and 0.10% Versene are added. The temperature is held at 65° C. and 0.2 parts of sodium sulfoxylate formaldehyde dissolved in 15 parts of water is added followed by the gradual addition over an 85-min. period of an emulsion of 155 parts of water, 0.1 part of sodium dodecylbenzene sulfonate and 234 parts of vinylidene chloride along with a cofeed of 0.6 parts of sodium sulfoxylate formaldehyde dissolved in 47 parts of water. Fifteen minutes after the completion of the feeds, 0.8 parts of t-butyl hydroperoxide is added and then 0.4 parts of sodium sulfoxylate formaldehyde dissolved in 8 parts of water. Thirty minutes later, the dispersion is cooled to room temperature and filtered through a 100-mesh screen. The dispersion has a solids content of 25.5%. The average particle diameter is 0.40 micron and the average void diameter is 0.27 micron.

As stated hereinbefore, the use of the core/sheath heteropolymer particles in aqueous coating compositions can serve to introduce microvoids which opacify the final film obtained and can eliminate, or reduce the amount of, particulate materials, such as pigments or extenders, normally introduced into aqueous coating compositions for the purpose of delustering and/or opacifying the films obtained, and increasing hiding power of the pigmented or unpigmented compositions.

Thus, the present invention contemplates the preparation of aqueous coating compositions comprising the mixing of the aqueous core/sheath heteropolymer dispersion of the present invention with an aqueous dispersion of a water-insoluble particulate material selected from (a) pigments, (b) extenders (e.g., silica, china clays, etc. mentioned in the Conn et al. patent, supra), and (c) vinyl addition polymers, especially those containing a small amount (e.g. ½ to 3 or even up to about 5 weight percent) of an acid, such as acrylic acid, methacrylic acid, and itaconic acid, which are film-forming at ambient temperatures and (d) mixtures of such particulate materials as are mentioned in (a), (b), and (c), adding a volatile basic swelling agent to raise the pH to about 8 to 12 or higher, thereby at least partially neutralizing the acid of the cores and swelling them, depositing a film of the composition on a solid substrate to be coated and/or impregnated and subsequently drying the film. Generally, the advantages of the use of the heteropolymer dispersion are noticeable when there is used an amount of such dispersion as will provide a quantity of core/sheath polymer solids that is at least 5% by weight of the total solids of the particular dispersions (a), (b), (c), or (d), and the benefits become more pronounced as the proportion of the core/sheath heteropolymer increases to 10% or higher, the most notable effect being observed when the proportion is increased to the range of 50% to 95% of the total particulate materials (solids).

The compositions are useful not only in the field of paints but also in many other fields. For example, pigmented compositions may be applied to paper to provide coated products of various types. Grease-proof papers may be so prepared. Compositions may be modified with additional pigments and extenders, ratios of 4:1 to 30:1 of pigment to binder being best for coating of paper. The coated papers may be given a high gloss by a mild buffing.

Other interesting applications of the dispersions of interpolymers of this invention include their use for sealing, priming, or coating leather. The dispersions may also be used to improve the abrasion resistance of fabrics and to decrease the lint available therefrom. They are also valuable for preparing pastes for the printing of textiles such as canvas.

Similar compositions are desirable as sealers on felts. They can be applied to cement, stucco, concrete and other porous bodies to seal pores and prevent dusting and flaking.

Another interesting utility is the separation of ammonia or amines from aqueous solutions such as of inorganic salts or bases. Ion exchange resins and the like are not normally useful to selectively remove ammonia or amines from such solutions.

Hydrophilic monomers are mentioned hereinabove. Suitable ones include (meth)acrylamide, vinyl acetate, hydroxyethyl (meth)acrylate, hydroxypropyl (meth)acrylate, dihydroxypropyl (meth)acrylate, diacetone (meth)acrylamide, N-vinyl pyrrolidone, methoxyethyl (meth)acrylate di- and triethylene glycol (meth)acrylate, polyethylene glycol (meth)acrylate, and (meth)acrylonitrile.

We claim:

1. A process for making an aqueous dispersion of water-insoluble core/sheath polymer particles comprising
    (a) sequentially emulsion polymerizing at a temperature of from about 10° C. to about 100° C. in an aqueous medium containing a free radical initiator:
    a core monomer system comprising one or more monoethyleneically unsaturated monomers having a group of the formula —HC=C<, at least one of which has a carboxylic acid group, the core monomer system comprising at least 5% of a carboxylic acid monomer based on the weight of the core monomer system, to thereby form dispersed core particles having an average diameter of from about 0.05 to 1 micron, and (b) polymerizing in the presence of the core polymer dispersion resulting from (a) a sheath monomer system comprising at least one monoethylenically unsaturated monomer having no ionizable group to form a sheath polymer on the core particles, any monoethylenically unsaturated carboxylic acid in the sheath monomer mixture being present in an amount of no more than 10% by weight of the sheath monomers, the proportion of carboxylic acid in the sheath monomer mixture being less than ⅓ the proportion thereof in the core monomer mixture, said sheath being (i) permeable to an aqueous volatile base selected from ammonia and amines, (ii) having a $T_i$ of greater than 50° C., and (iii) being non film-forming at 20° C., the resultant core-sheath particles having an average diameter before neutralization and swelling of from about 0.07 to 4.5 microns, the relative amounts of core-forming monomer(s) and sheath-forming monomer(s) being such that the ratio of the weight of the core to the weight of the total polymer in the resulting dispersed particles is from about 1:4 to 1:100, and (c) neutralizing with ammonia or amine so as to swell said core and form particles which, when dried, contain a single void and cause opacity in compositions in which they are contained.

2. A process according to claim 1 wherein the acid monomer in (a) is selected from the group consisting of acrylic acid, methacrylic acid, acryloxypropionic acid, methacryloxypropionic acid, acryloxyacetic acid, methacryloxyacetic acid, monomethyl acid maleate, monomethyl acid itaconate, crotonic acid, and mixtures thereof.

3. A process according to claim 1 wherein the acid in (a) is selected from the group consisting of acrylic acid and methacrylic acid, and the core monomer(s) comprise(s) at least 15% of said acid monomer, the core monomer composition having no more than 40% of butyl acrylate or no more than an amount of an equivalent monomer which would give a comparable $T_i$ when using the same comonomer combination.

4. A process according to claim 1 wherein at least about 85% of the core particles are encapsulated as evidenced by titration with aqueous potassium hydroxides.

5. A process according to claim 4 in which the formation of dispersed core particles in (a) is a multistage process involving first the preparation of a seed polymer from monoethylenically unsaturated monomers which may or may not comprise a monomer containing an acid group, and a second stage polymerization on the seed particles of ethylenically unsaturated monomers comprising (1) 5 to 100 weight % of a carboxylic acid,
(2) 0 to 95 weight % of at least one monoethylenically unsaturated monomer lacking an ionizable group, and
(3) 0 to 20 weight % of a polyethylenically unsaturated monomer, using conditions to obtain core polymer particles having an average diameter of from 0.1 to 0.5 micron in unswollen condition, and the subsequently polymerized sheath provides core/sheath particles having an average diameter of up to about 2.0 microns in unswollen condition.

6. A process according to claim 5 in which the acid is selected from the group consisting of acrylic acid, methacrylic acid, acryloxypropionic acid, methacryloxypropionic acid, acryloxyacetic acid, methacryloxyacetic acid, monomethyl acid maleate, monomethyl acid itaconate, crotonic acid and mixtures thereof, and the core monomer(s) comprise(s) at least 15% of said acid monomer, the core monomer composition having no more than 40% of butyl acrylate or no more than an amount of an equivalent monomer which would give a comparable $T_i$ when using the same comonomer combination.

7. A process according to claim 5 in which the acid is selected from the group consisting of acrylic acid, methacrylic acid, and mixtures thereof.

8. A process according to claim 7 in which the core/sheath particles have an average diameter of from about 0.2 to about 2.0 microns in unswollen condition and in which 0.1% to 3% of a polyunsaturated crosslinking monomer is included in the core monomer mixture.

9. A process according to claim 4 in which the formation of the sheath in (b) is a multistage process.

10. A process according to claim 9 in which at least one stage of the multistage process for forming the sheath is the polymerization of a monomer composition comprising at least one nonionic monoethylenically unsaturated monomer.

11. A process according to claim 9 in which, in at least one stage of the multistage formation of the sheath, a crosslinked polymer is formed from a mixture of at least one monoethylenically unsaturated monomer and at least one polyethylenically unsaturated monomer, the amount of the latter being in the range of about 1% to about 50% by weight of the mixture, the core/sheath polymer being swollen by at least partial neutralization by application of a volatile base prior to the completion of the crosslinking stage when the amount of polyethylenically unsaturated monomer exceeds about 5% by weight of the monomer mixture.

12. A composition comprising an aqueous dispersion of water-insoluble core/sheath polymer particles having an average diameter of 0.07 to 4.5 microns, having a core polymerized from a monomer system comprising one or more monoethylenically unsaturated monomers having a group of the formula —HC=C<, at least one of said unsaturated monomers having a carboxylic acid group, and having at least one sheath polymerized from at least one different monomer system, at least one of said different monomer systems being hard and producing a polymer (a) having a $T_i$ greater than 50° C., (b) being non film-forming at 20° C., (c) being permeable to ammonia and amines, said core being swollen by neutralization with ammonia or amine in the presence of water, said particles having a property such that when subsequently dried a single cavity forms in said core and said particles cause opacity in compositions in which they are contained.

13. A process which comprises mixing the aqueous dispersion of water insoluble core/sheath polymer particles of claim 12 with an aqueous dispersion of a particulate material selected from pigments, extenders, vinyl addition emulsion polymers, and mixtures thereof to form a coating composition.

14. A process according to claim 13 which comprises the additional steps of depositing a film of the coating composition on a solid substrate to be coated and/or impregnated, and subsequently drying the composition, forming single cavities in the core of substantially each of said particles so as to contribute to opacity of said film.

15. An opaque composition comprising dried core/sheath particles having a single cavity in said core and an average particle size of about 0.07 to 4.5 micron and having a core polymerized from a monomer system comprising one or more monoethylenically unsaturated monomers having a group of the formula —HC═C<, at least one of said unsaturated monomers having a carboxylic acid group, and having at least one sheath polymerized from at least one different monomer system, at least one of said different monomer systems being hard and producing a polymer (a) having a $T_i$ greater than 50° C., (b) being non film-forming at 20° C., (c) being permeable to ammonia and amines, said core having been swollen by neutralization with ammonia or amine in the presence of water, and subsequently dried.

16. A composition for coating and/or impregnating a substrate comprising (1) a film-forming vinyl addition polymer either dissolved or dispersed in an aqueous medium and (2) an aqueous dispersion of water-insoluble core/sheath polymer particles of claim 12.

17. A composition adapted for coating and/or impregnating comprising an aqueous dispersion of a water-insoluble emulsion vinyl addition polymer having an apparent second order transition temperature ($T_i$) of about 17° to 20° C., a core/sheath product of claim 12 at a pigment volume concentration of 5 to 50% or higher, an inorganic pigment and optionally an extender.

18. A process according to claim 1 in which the formation of the sheath in (b) is a multistage process comprising first forming a hard and/or crosslinked polymer sheath, then forming a soft polymer sheath of monomers selected to provide a relatively softer polymer having a $T_i$ of less than 50° C. and at least 10° C. lower than that of the hard sheath polymer.

19. A process according to claim 18 in which the $T_i$ of the polymer at the exterior surface of the particles is in range from below 0° C. up to about 20° C.

20. The process of claim 1 wherein said resultant core/sheath particles are, prior to swelling, essentially impermeable at 20° C. to fixed or permanent bases including sodium, potassium, calcium and magnesium hydroxide.

21. The composition of claim 12 wherein said polymer is, prior to swelling, essentially impermeable at 20° C. to fixed or permanent bases including sodium, potassium, calcium and magnesium hydroxide.

22. The composition of claim 15 wherein said particles are, prior to swelling, essentially impermeable at 20° C. to fixed or permanent bases including sodium, potassium, calcium and magnesium hydroxide.

23. The process of claim 1 wherein, subsequent to neutralizing in step (c), a second sheath stage is polymerized on said core-sheath particles.

24. The composition of claim 12 wherein a second sheath is polymerized onto the particles after neutralization.

25. The composition of claim 24 wherein the second sheath is crosslinked or uncrosslinked polystyrene.

* * * * *